(12) United States Patent
Sishtla et al.

(10) Patent No.: US 11,929,643 B2
(45) Date of Patent: Mar. 12, 2024

(54) COMPRESSOR MOTOR INCLUDING ACTIVE STATOR COOLING

(71) Applicant: Carrier Corporation, Palm Beach Gardens, FL (US)

(72) Inventors: Vishnu M. Sishtla, Palm Beach Gardens, FL (US); Michael Westlake, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 613 days.

(21) Appl. No.: 17/255,125

(22) PCT Filed: Jun. 25, 2020

(86) PCT No.: PCT/US2020/039549
§ 371 (c)(1),
(2) Date: Dec. 22, 2020

(87) PCT Pub. No.: WO2020/264111
PCT Pub. Date: Dec. 30, 2020

(65) Prior Publication Data
US 2022/0255373 A1    Aug. 11, 2022

Related U.S. Application Data

(60) Provisional application No. 62/866,739, filed on Jun. 26, 2019.

(51) Int. Cl.
*H02K 1/20* (2006.01)
*H02K 1/16* (2006.01)
*H02K 9/193* (2006.01)
(52) U.S. Cl.
CPC ............... *H02K 1/20* (2013.01); *H02K 1/165* (2013.01); *H02K 9/193* (2013.01)

(58) Field of Classification Search
CPC ........... H02K 1/20; H02K 1/165; H02K 9/193
See application file for complete search history.

(56) References Cited

U.S. PATENT DOCUMENTS

| 4,182,137 | A  | * | 1/1980 | Erth ......................... | H02K 1/20 |
|           |    |   |        |                                | 62/505 |
| 2012/0080982 | A1 | * | 4/2012 | Bradfield ................. | H02K 9/00 |
|           |    |   |        |                                | 310/60 A |

(Continued)

FOREIGN PATENT DOCUMENTS

| EP | 2975734 | 1/2016 |
| GB | 2012118 | 7/1979 |

OTHER PUBLICATIONS

International Preliminary Report on Patentability for International Application No. PCT/US2020/039549 dated Dec. 28, 2021.

(Continued)

*Primary Examiner* — Tulsidas C Patel
*Assistant Examiner* — Mohammed Ahmed Qureshi
(74) *Attorney, Agent, or Firm* — Carlson, Gaskey & Olds, P.C.

(57) ABSTRACT

An electric compressor motor includes a stator ring having a plurality of stator winding slots and a plurality of stator windings. Each of said stator windings is received in a stator winding slot of the plurality of stator winding slots. The stator ring also includes a plurality of cooling slots. Each cooling slot in the plurality of coolant slots is defined along an axial length of at least one corresponding stator winding slot of the plurality of stator winding slots such that a shared opening between each stator winding slot and at least one corresponding coolant slot is defined. The cooling slots are configured to allow coolant to directly contact at least one stator winding in the corresponding at least one stator winding slot.

22 Claims, 4 Drawing Sheets

(56) References Cited

U.S. PATENT DOCUMENTS

2014/0056726 A1* 2/2014 Garrard .................. H02K 9/19
  417/372
2016/0006302 A1* 1/2016 Gugel ..................... H02K 3/24
  310/54

OTHER PUBLICATIONS

International Search Report and Written Opinion for International Patent Application No. PCT/US2020/039549 dated Oct. 6, 2020.

* cited by examiner

COMPRESSOR MOTOR INCLUDING ACTIVE STATOR COOLING

CROSS-REFERENCE TO RELATED APPLICATION

This application claim priority to U.S. Provisional Application No. 62/866,739 filed on Jun. 26, 2019.

TECHNICAL FIELD

The present disclosure relates generally to compressor motor architectures, and more specifically to a compressor motor architecture including an active stator cooling configuration.

BACKGROUND

Electric compressors typically include an electric motor that converts stored electrical power into rotational motion of a shaft. The rotation of the shaft is provided to a corresponding compressor portion that uses rotation to ingest air, or another fluid such as a coolant, and a decreasing stage size to compress the ingested fluid to a compressed state. Once compressed, the fluid is provided from the compressor to another system or stored in a compressed fluid storage tank for later use.

Operation of the electric motor can generate heat due to the expenditure of electrical energy and the inbuilt resistances of the motor. The heat is particularly prominent in a stator portion of the electric motor. In some systems, the electric motor is cooled by spraying the end caps of the motor stators with a coolant. Overcooling allows the internal portions of the stator windings and the rotor windings to be sufficiently cooled. In such systems, however, insufficient coolant can result in overheating at the center of the stator and/or uneven thermal wear on the stator.

SUMMARY OF THE INVENTION

In one exemplary embodiment an electric compressor motor includes a stator ring including a plurality of stator winding slots and a plurality of stator windings, wherein each of said stator windings is received in a stator winding slot of the plurality of stator winding slots, a plurality of cooling slots, each cooling slot in the plurality of coolant slots being defined along an axial length of at least one corresponding stator winding slot of the plurality of stator winding slots such that a shared opening between each stator winding slot and at least one corresponding coolant slot is defined, and wherein the cooling slots are configured to allow coolant to directly contact at least one stator winding in the corresponding at least one stator winding slot.

Another example of the above described electric compressor motor further includes a housing surrounding the stator ring and defining at least one cavity at a first axial end of the stator ring, the at least one cavity including a first coolant drain port.

In another example of any of the above described electric compressor motors the housing defines a second cavity at a second axial end of the stator ring, opposite the first axial end of the stator ring, the second cavity including a second coolant drain port.

Another example of any of the above described electric compressor motors further includes a coolant injection port configured to provide a coolant to a coolant plenum, the coolant plenum being configured to disperse the coolant to the plurality of cooling slots.

In another example of any of the above described electric compressor motors a wall connecting the coolant plenum to the stator ring defines a plurality of through holes and each of the through holes connects the coolant plenum to a corresponding cooling slot of the plurality of coolant slots.

In another example of any of the above described electric compressor motors a second wall connecting the coolant plenum to the stator ring defines a second plurality of through holes, and each of the through holes connects the plenum to a corresponding cooling slot of the plurality of coolant slots.

In another example of any of the above described electric compressor motors the coolant plenum is disposed at a first axial end of the stator ring.

In another example of any of the above described electric compressor motors the coolant plenum is disposed in a mid-section of the stator ring, and wherein coolant slots extend axially outward from the coolant plenum in two axial directions.

In another example of any of the above described electric compressor motors each of the coolant slots extends radially outward from the corresponding stator winding slot, and wherein each of the coolant slots.

In another example of any of the above described electric compressor motors the number of coolant slots and the number of stator winding slots are the same.

In another example of any of the above described electric compressor motors each of the coolant slots is disposed circumferentially between two corresponding stator winding slots.

In another example of any of the above described electric compressor motors the number of coolant slots is less than the number of stator winding slots.

An exemplary method for cooling an electric motor includes injecting a coolant into a coolant slot defined within a stator lamination of an electric motor, and passing the coolant through the coolant slot along an axial length of the stator lamination such that the coolant directly contacts at least one stator winding disposed in a corresponding stator winding slot.

Another example of the above described method for cooling an electric motor includes expelling the coolant from the coolant slot into at least one cavity at an axial end of the stator lamination.

Another example of any of the above described methods for cooling an electric motor includes expelling the coolant from the coolant slot into a first cavity at a first axial end of the stator lamination and into a second cavity at a second axial end of the stator lamination.

In another example of any of the above described methods for cooling an electric motor injecting the coolant in the coolant slot comprises providing coolant to a coolant plenum at a first axial end of the stator lamination.

In another example of any of the above described methods for cooling an electric motor injecting the coolant in the coolant slot comprises providing coolant to a coolant plenum at a mid-portion of the stator lamination.

In another example of any of the above described methods for cooling an electric motor the coolant slot is defined radially outward of a corresponding stator winding slot.

In another example of any of the above described methods for cooling an electric motor the coolant slot is defined circumferentially between a first corresponding stator winding slot and a second corresponding stator winding slot.

In one exemplary embodiment an electric compressor includes a compressor portion having a rotational input, an electric motor including a housing, a stator ring fixedly mounted to the housing, a rotor ring defined radially inward to the stator ring and being fixedly mounted to a shaft output, the shaft output being mechanically connected to the rotational input of the compressor portion, and the stator ring including a plurality of stator winding slots and a plurality of coolant slots, each of the coolant slots sharing an open edge with at least one corresponding stator winding slot such that coolant directly contacts a stator winding disposed in the corresponding stator winding slot.

These and other features of the present invention can be best understood from the following specification and drawings, the following of which is a brief description.

DETAILED DESCRIPTION

Figure 1:
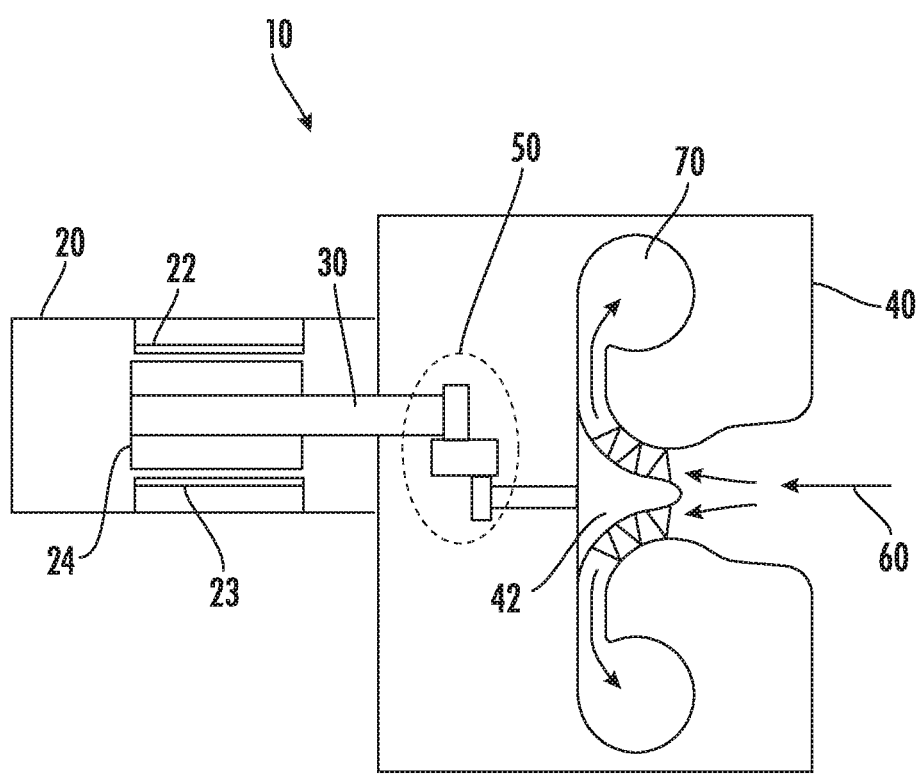
FIG. 1 illustrates a highly schematic electric compressor according to one example.

FIG. 1 schematically illustrates an exemplary compressor system 10. The exemplary compressor system 10 includes an electric motor 20 having multiple stator windings 22 disposed radially outward of multiple rotor windings 24. The rotor windings 24 are connected to a shaft 30. Passing an electrical current through the stator windings 22 causes a corresponding current to be driven through the rotor windings 24, and drives rotation of the shaft 30. The electrical mechanisms and operations of electric motors are known in the art and are not expanded on herein.

The shaft 30 is connected to a compressor 40 via a gear 50. In alternative examples, the gear 50 can be replaced with a direct drive configuration, or with any other system for conveying the rotation of the shaft 30 to a compressor rotor 42. Rotation of the compressor rotor 42 draws in refrigerant 60, compresses the refrigerant 60 and provides the compressed refrigerant to a plenum 70. The compressed fluid in the plenum 70 is then provided to any other system as needed.

During the course of this operation, the electric motor 20, and specifically the stator windings 22 within the electric motor 20, can heat to excessive temperatures. In order to prevent the excessive temperatures from damaging the stator windings 22, or any other portions of the electric motor 20 or the compressor 10, a coolant is passed through slots 23 in the stator 22. The slots 23 allow the coolant to pass entirely through the stator 22 and allow the coolant to directly contact the stator windings, thereby providing efficient cooling of the stator 22.

Figure 2:
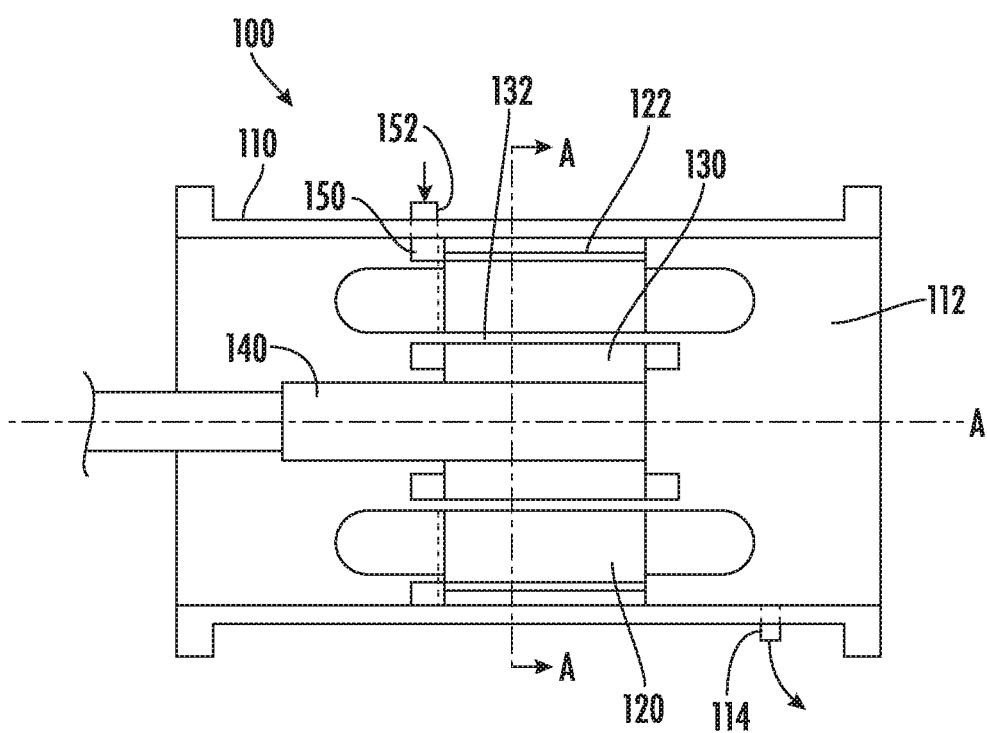
FIG. 2 schematically illustrates a cross sectional view of an exemplary electric motor along an axis of a motor shaft.
Figure 3:
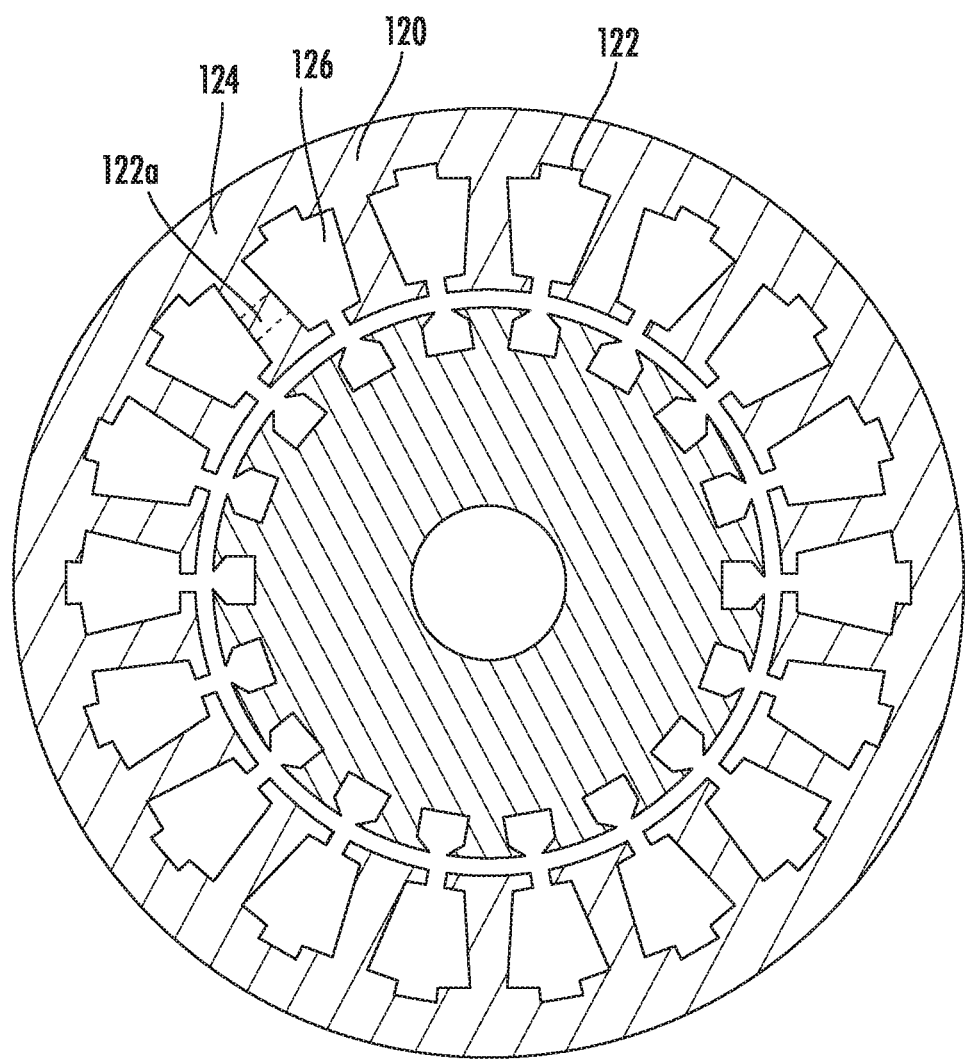
FIG. 3 schematically illustrates a radial cross section of the electric motor of FIG. 2.

With continued reference to FIG. 1, FIG. 2 schematically illustrates an exemplary electric motor 100 for use in the electric compressor 10 of FIG. 1. FIG. 3 schematically illustrates a cross section of the motor 100 at cross section A-A. In the illustration of FIG. 3, conventional portions of the motor 100 are omitted to more clearly illustrate the features being described. The electric motor 100 includes a housing 110. A stator ring 120 is mounted to the housing 110, and is positioned radially outward from a rotor ring 130. The stator ring 120 and the rotor ring 130 are separated by an air gap 132, which allows the rotor ring 130 to rotate freely. The rotor ring 130 is fixedly mounted to a shaft 140. The shaft 140 defines an axis A, about which the shaft 140 is driven to rotate when current is passed through the stator windings in the stator ring 120.

The stator ring 120 includes a lamination 124 defining multiple stator winding slots 126. Electrical windings are disposed in the stator winding slots 126, and allow the electric motor 100 to function. Also included in the stator winding 120 are multiple coolant slots 122 that extend the full axial length of the stator ring 120. Each of the coolant slots 122 is connected to at least one stator slot 126, and allows coolant passing through the coolant slot 122 to directly contact the windings disposed in the stator slot 126. In the example of FIG. 3, the coolant slots 122 are disposed immediately radially outward of, and extend radially outward from, each stator slot 126. In alternative examples, the coolant slots 122 can be positioned in an alternate location (coolant slot 122a) and a single coolant slot 122a can provide coolant to two adjacent stator slots 126.

During operation of the electric motor 100, a coolant such as R-134a, R513a, R1233zd, is injected into a plenum 150 via a coolant injection port 152. In alternative examples any non-conductive coolant can be utilized including low global warming potential (GWP) coolants. After the coolant has passed through the slot 122, the coolant is expelled into a cavity 112 at an end axially opposite the end of the slot 122 where the coolant is injected. A drain port 114 is positioned within the housing 110 and allows the spent coolant to drain out of the cavity 112. The drain port 114 is located at a bottom of the electric motor 100, relative to gravity while the electric motor 100 is in an installed position.

Figure 4:
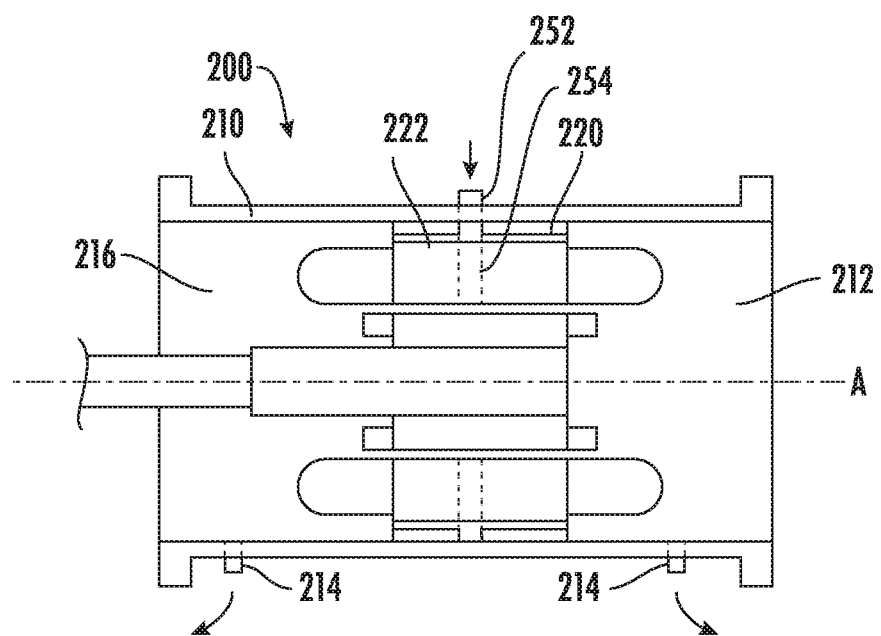
FIG. 4 schematically illustrates a cross sectional view of another exemplary electric motor along an axis of the shaft.

With continued reference to FIGS. 1-3, FIG. 4 illustrates an alternate example of the electric motor 20 of FIG. 1. The electric motor 200 of FIG. 4 is substantially identical to the electric motor 100 of FIG. 2, with a modification to the location of the coolant inlet port 252. Rather than injecting the coolant into the coolant slots 222 from an axial end of the stator ring 220, the coolant inlet port 252 is positioned in or near a center portion of the stator ring 220, and the coolant is passed through the coolant slot 222 to both ends of the electric motor 200. The first cavity 212 and a second cavity 216 each receive the spent coolant from the corresponding axial end of the stator ring 220. As with the example of FIG. 2, each of the drain ports 214 is positioned at a bottom of the electric motor housing 210, relative to gravity while the electric motor 200 is in an installed position.

Figure 5:
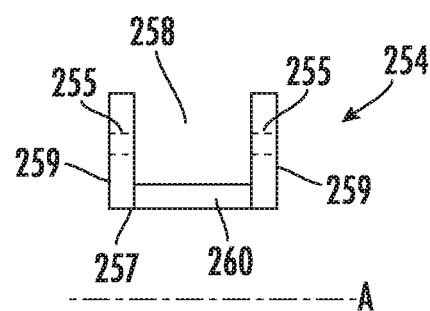
FIG. 5 schematically illustrates a cross section of an exemplary annular ring.

In order to facilitate the positioning of the inlet at a mid-portion of the stator, the motor 200 includes an annular ring 254. The annular ring structure 254 is illustrated in greater detail in FIG. 5. The annular ring structure 254 includes two radially aligned annular rings 259 connected to each other at a radially innermost edge 257 by a wall. The combination of the annular rings 259 and the wall 260 from a plenum 258 that distributes the coolant to corresponding coolant slots 222 through holes 255 in the annular rings 259.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An electric compressor motor comprising:
a stator ring surrounding an axis and extending along the axis from a first end to a second end, the stator ring including a plurality of stator winding slots and a plurality of stator windings, wherein each of said plurality of stator windings is received in a stator winding slot of the plurality of stator winding slots;
a plurality of cooling slots, spaced from the plurality of stator winding slots, and which each extend from the first end to the second end of the stator ring, each cooling slot in the plurality of cooling slots extending from a first slot end to a second slot end along an axial length of at least one corresponding stator winding slot of the plurality of stator winding slots such that a shared opening between each stator winding slot and at least one corresponding cooling slot is defined;
wherein the plurality of cooling slots are configured to allow coolant to directly contact at least one stator winding in the corresponding at least one stator winding slot; and
wherein the coolant passes through the plurality of cooling slots in a direction along the axis and is expelled from at least one of the first slot end and second slot end into at least one cavity at one of the first end and the second end of the stator ring.

2. The electric compressor motor of claim 1, further comprising a housing surrounding the stator ring and defining the at least one cavity at the first end of the stator ring, the at least one cavity including a first coolant drain port.

3. The electric compressor motor of claim 2, wherein the housing defines a second cavity at the second end of the stator ring, opposite the first end of the stator ring, the second cavity including a second coolant drain port.

4. The electric compressor motor of claim 1, further comprising a coolant injection port configured to provide a coolant to a coolant plenum, the coolant plenum being configured to disperse the coolant to the plurality of cooling slots.

5. The electric compressor motor of claim 4, wherein a wall connecting the coolant plenum to the stator ring defines a plurality of through holes, each through hole extending in a direction along the axis from a first hole end to a second hole end, and wherein each of the through holes connects the coolant plenum to a corresponding cooling slot of the plurality of cooling slots.

6. The electric compressor motor of claim 5, wherein the wall comprises a first wall and the plurality of through holes comprises a first plurality of through holes, and including second wall connecting the coolant plenum to the stator ring and defining a second plurality of through holes, the coolant plenum being formed between the first wall and the second wall, and wherein each of the through holes in the first plurality of through holes connects the coolant plenum to a corresponding cooling slot of the plurality of cooling slots that extends to the first end of the stator ring, and wherein each of the through holes in the second plurality of through holes connects the coolant plenum to a corresponding cooling slot of the plurality of cooling slots that extends to the second end of the stator ring.

7. The electric compressor motor of claim 4, wherein the coolant plenum is disposed at a first axial end of the stator ring and comprises a fluid connection to the plurality of cooling slots at one of the first slot end or second slot end.

8. The electric compressor motor of claim 4, wherein the coolant plenum is disposed in a mid-section of the stator ring, and wherein the plurality of cooling slots extend axially outward from the coolant plenum in two axial directions such that a first set of cooling slots extend in a first axial direction along the axis from the coolant plenum to the first end of the stator ring and a second set of cooling slots extend in a second axial direction along the axis from the coolant plenum to the second end of the stator ring.

9. The electric compressor motor of claim 1, wherein each of the cooling slots extends radially outward from the corresponding stator winding slot.

10. The electric compressor motor of claim 9, wherein a number of cooling slots and a number of stator winding slots are the same.

11. The electric compressor motor of claim 1, wherein each of the cooling slots is disposed circumferentially between two corresponding stator winding slots.

12. The electric compressor motor of claim 11, wherein a number of cooling slots is less than a number of stator winding slots.

13. The electric compressor motor of claim 1, wherein each of the coolant slots is radially spaced from a corresponding stator winding slot and is aligned with a center of the corresponding stator winding slot in a direction extending radially from the axis.

14. A method for cooling an electric motor comprising:
injecting a coolant into a coolant slot defined within a stator lamination of an electric motor, wherein the stator lamination surrounds an axis and extends along the axis from a first end to a second end of the stator lamination, and wherein the coolant slot extends from a first slot end at the first end of the stator lamination to a second slot end at the second end of the stator lamination;
passing the coolant through the coolant slot along an axial length of the stator lamination such that the coolant directly contacts at least one stator winding disposed in a corresponding stator winding slot that is spaced from the coolant slot; and
passing the coolant through the coolant slot in a direction along the axis and expelling the coolant from one of the first slot end or second slot end into at least one cavity at one of the first end and the second end of the stator lamination.

15. The method of claim 14, wherein the at least one cavity comprises a first cavity and a second cavity, and expelling the coolant from the coolant slot into the first cavity at the first end of the stator lamination and into the second cavity at the second end of the stator lamination.

16. The method of claim 14, wherein injecting the coolant in the coolant slot comprises providing coolant to a coolant plenum at the first end of the stator lamination, the coolant plenum comprising a fluid connection to the coolant slot at one of the first slot end or second slot end.

17. The method of claim 14, wherein injecting the coolant in the coolant slot comprises providing coolant to a coolant plenum at a mid-portion of the stator lamination, and including expelling the coolant in opposing directions from the first end and the second end of the stator lamination.

18. The method of claim 14, wherein the coolant slot is defined radially outward of a corresponding stator winding slot.

19. The method of claim 14, wherein the coolant slot is defined circumferentially between a first corresponding stator winding slot and a second corresponding stator winding slot.

20. The method of claim 14, including:
radially spacing each coolant slot from a corresponding stator winding slot and aligning the coolant slot with a center of the corresponding stator winding slot in a direction extending radially from the axis; or extending each coolant slot circumferentially from one stator winding slot to an adjacent stator winding slot.

21. An electric compressor comprising:

a compressor portion having a rotational input;

an electric motor including a housing, a stator ring fixedly mounted to the housing, a rotor ring defined radially inward to the stator ring and being fixedly mounted to a shaft output that rotates about an axis, the shaft output being mechanically connected to the rotational input of the compressor portion; and the stator ring extending along the axis from a first end to a second end and including a plurality of stator winding slots and a plurality of coolant slots that are spaced from the plurality of stator winding slots, wherein each cooling slot in the plurality of coolant slots extends from a first slot end to a second slot end along the axis, and wherein each of the coolant slots sharing an open edge with at least one corresponding stator winding slot such that coolant directly contacts a stator winding disposed in the corresponding stator winding slot, and wherein the coolant passes through the plurality of coolant slots in a direction along the axis and is expelled from at least one of the first slot end and second slot end into at least one cavity at one of the first end and the second end of the stator ring.

22. The electric compressor of claim 21, wherein:

each coolant slot is radially spaced from a corresponding stator winding slot and is aligned with a center of the corresponding stator winding slot in a direction extending radially from the axis, or each coolant slot is extends circumferentially from one stator winding slot to an adjacent stator winding slot of the plurality of stator winding slots.

\* \* \* \* \*